United States Patent [19]

Futaesaku et al.

[11] Patent Number: 5,521,260

[45] Date of Patent: May 28, 1996

[54] THERMOSETTING RESIN COMPOSITION

[75] Inventors: Norio Futaesaku; Hideo Fukuda; Yoshie Ito; Isao Maruyama, all of Ichihara, Japan

[73] Assignee: Maruzen Petrochemical Co., Ltd., Tokyo, Japan

[21] Appl. No.: 346,907

[22] Filed: Nov. 30, 1994

[30] Foreign Application Priority Data

Dec. 3, 1993 [JP] Japan .................... 5-339634

[51] Int. Cl.$^6$ .................... C08L 61/06; C08L 61/10
[52] U.S. Cl. .................... 525/502; 525/480; 525/504
[58] Field of Search .................... 525/502, 504, 525/480

[56] References Cited

U.S. PATENT DOCUMENTS

| | | | |
|---|---|---|---|
| 4,579,916 | 4/1986 | Schmid et al. | 525/502 |
| 4,587,317 | 5/1986 | Rennes | 526/259 |
| 4,666,997 | 3/1987 | Renner et al. | 525/502 |
| 4,678,849 | 7/1987 | Liu et al. | 526/259 |
| 4,745,166 | 5/1988 | Renner et al. | 526/259 |
| 4,778,898 | 10/1988 | Vonlanthen et al. | 548/415 |
| 4,885,346 | 12/1989 | Kramer et al. | 525/426 |
| 4,966,923 | 10/1990 | Banks et al. | 522/167 |

*Primary Examiner*—W. Robinson H. Clark
*Attorney, Agent, or Firm*—Melvin I. Stoltz

[57] ABSTRACT

A thermosetting resin composition comprising compounds (A) an alkenyl-substituted nadimide, (B) a compound having at least one vinyl group or cyclic olefin, or both and (C) a phenol resin, and optionally (D) at least one polymerization catalyst selected from the group consisting of organic peroxides, onium salts, and cationic catalysts is disclosed. The components contained in the composition exhibit excellent compatibility among them. The cured product obtained from the thermosetting resin composition has superior anti-hygroscopicity and toughness, without impairing excellent heat resistance, electrical characteristics, mechanical strength, and small molding shrinkage inherently possessed by alkenyl-substituted nadimide resin. The composition is useful not only as a laminating material, a casting material, a molding material, a coating material, a paint, an adhesive, a sealing material, etc., but also as a matrix resin for composite materials.

30 Claims, No Drawings

THERMOSETTING RESIN COMPOSITION

BACKGROUND OF THE INVENTION

1. Field of the Invention

The present invention relates to a thermosetting resin composition comprising an alkenyl-substituted nadimide, of which the components exhibit excellent compatibility. The composition of the present invention exhibits superior anti-hygroscopicity and superb toughness, and can be used in the absence of a solvent. It is useful as a laminating material, a casting material, a molding material, a coating material, a paint, an adhesive, a sealing material and the like. It is useful also as a matrix resin for composite materials using glass fiber, carbon fiber, or the like as a reinforcing material.

2. Description of the Prior Art

Introduction of allyl group to nadimide which is one of raw materials of thermosetting resins is known to decrease the melting point of the imide raw material, to increase its solubility in solvents, to decrease the setting temperature to a certain degree, and to inhibit generation of volatile compounds when the resin is cured. In addition, the resulting thermosets, i.e., cured materials, are known to exhibit minimal decrease in their properties such as heat resistance, electrical characteristics, mechanical strength, and the like. Thermosets, however, are generally inferior to thermoplastic resins in terms of toughness, and thermosets made from alkenyl-substituted nadimide are no exception. There is a demand for increasing toughness of alkenyl-substituted nadimide as the application of this material expands in recent years. Anti-hygroscopicity is an important characteristic demanded for materials used in the field of electronics and electrical appliances. Polyimides, in general, have high hygroscopicity due to the imide bond, and alkenyl-substituted nadimide also possesses poor anti-hygroscopicity.

Among these characteristics demanded for thermosets, various studies have been undertaken regarding improvement limited to the toughness, and a process recently proposed for increasing the toughness while preserving the high heat resistance is adding a thermoplastic resin with high heat resistance, such as polysulfone, polyether ketone, polyether imide, or aromatic polyester, to epoxy resin. Addition of polyether imide or polyhydantoin to bismaleimide, one of thermosetting polyimide resins, for increasing the toughness has been also proposed [Int. SAMPE Symp., Vol. 33, 1546 (1988)]. Because these thermoplastic resins have poor compatibility with epoxy resin or maleimide resin, a solvent must be used in almost all cases. Because of this circumstance, the application of these resin compositions must be limited to films, thin coatings, or the like from which solvents can be easily vaporized for removal.

A resin composition comprising alkenyl-substituted nadimide and epoxy resin has been developed for the purposes of improving the toughness and anti-hygroscopicity (U.S. Pat. No. 4,579,916). This resin composition has a drawback in that high heat resistance inherently possessed by alkenyl-substituted nadimide is impaired.

More recently, a synthetic resin composition comprising a novolak-type phenol resin, divinylbenzene, and ethylstyrene, having improved toughness and anti-hygroscopicity, has been reported (Japanese Patent Laid-open No. Hei 5 (1993)-117337). This synthetic resin composition has drawbacks still to be improved in its heat resistance, mechanical strength at high temperatures, and molding shrinkage.

SUMMARY OF THE INVENTION

An object of the present invention is to provide a thermosetting resin composition comprising alkenyl-substituted nadimide, which is free from these drawbacks possessed by conventional resin compositions, exhibits excellent compatibility among its components contained therein, and the thermoset resin obtained from the resin composition has superior anti-hygroscopicity and toughness, without impairing heat resistance, electrical characteristics, mechanical strength, and small molding shrinkage.

Other object of the present invention will be apparent to the persons in the art from the disclosures and Examples given hereunder.

In view of this situation, we have conducted extensive studies, and have found that a resin composition of which the components exhibit good compatibility can be obtained by the blending a compound having at least one vinyl group and/or cyclic olefin and a phenol resin with alkenyl-substituted nadimide. We have further found that cured products obtained from this resin composition exhibit not only excellent heat resistance, electrical characteristics, and mechanical strength, but also superior anti-hygroscopicity and toughness. These findings have led to the completion of the present invention.

Thus, the gist of the present invention resides in a thermosetting resin composition comprising components
(A) an alkenyl-substituted nadimide,
(B) a compound having at least one vinyl group or cyclic olefin, or both, and
(C) a phenol resin.

DETAILED DESCRIPTION OF THE INVENTION

Preferred examples of alkenyl-substituted nadimide used as component (A) in the present invention are compounds represented by the following formula (1).

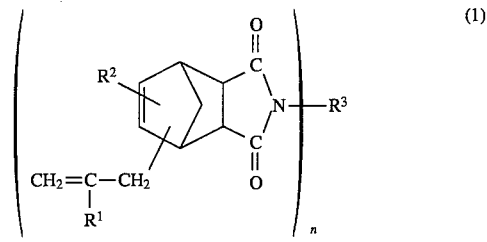

In the formula, $R^1$ and $R^2$ may be same or different and individually represent a hydrogen atom or a methyl group; n is an integer of 1 or 2; and when n is 1, $R^3$ represents a $C_1$-$C_{12}$ alkyl group, a $C_3$-$C_6$ alkenyl group, a $C_5$-$C_8$ cycloalkyl group, a $C_6$-$C_{12}$ monovalent aromatic group, a benzyl group, a group $-\{(C_qH_{2q}O)_t(C_rH_{2r}O)_uC_vH_{2v+1}\}$ (wherein q, r and v individually indicate an integer of 2–6, t is an integer of 1 or 0, and u denotes an integer of 1–30), or a group $-C_6H_4-T-C_6H_5$ (wherein T represents $-CH_2-$, $-C(CH_3)_2-$, $-CO-$, $-O-$, $-S-$, or $-SO_2-$), and when n is 2, $R^3$ represents a $C_2$-$C_{20}$ alkylene group, a $C_5$-$C_8$ cycloalkylene group, a group $-\{(C_xH_{2x}O)_y(C_zH_{2z}O)_wC_bH_{2b}\}-$ (wherein x, z, and b individually indicate an integer of 2–6, y is an integer of 1 or 0, and w denotes an integer of 1–30), a $C_6$-$C_{12}$ divalent aromatic group, a group $-R-C_6H_4-(R')_m-$ (wherein m is an integer of 0 or 1 and R and R' may be the same or different and each individually represents a $C_1$-$C_4$ alkylene group or a $C_5$-$C_8$ cycloalkylene group), or a group $-C_6H_4$-A-$C_6H_4-$ (wherein A represents $-CH_2-$, $-C(C_3)_2-$, $-CO-$, $-O-$, $-OC_6H_4C(CH_3)_2 C_6H_4O-$, $-S-$, or $-SO_2-$).

In the above formula (1), 1–3 hydrogens in $R^3$ may be substituted by hydroxyl groups.

In the compounds represented by formula (1) above, nadimides having two alkenyl groups in the molecule are preferred. Compounds having n of 2, i.e., bisnadimides are more preferred. Further, among the bisnadimides, bisnadimides having $R^3$ of (i) a $C_2$-$C_{20}$ alkylene group, (ii) —R-$C_6H_4$-$(R')_m$— (wherein R, R' and m are as specified above) or (iii) —$C_6H_4$-A-$C_6H_4$— (wherein A is as specified above) are still more preferred. When n is 1, compounds having a $C_3$-$C_6$ alkenyl group as $R^3$ are preferred.

Given as examples of the asymmetric alkylene-phenylene group and asymmetric alkylene-phenylene-alkylene group which are within the scope of the chemical formula of —R-$C_6H_4$-$(R')_m$— appearing within the definition of $R^3$ when n is 2 in formula (1), are groups of the following formulas (2)–(6).

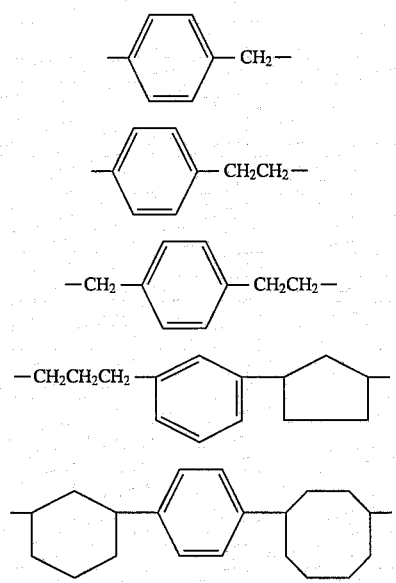

Typical examples of alkenyl-substituted nadimides represented by formula (1) are illustrated below:

When n is 1, following compounds can be shown:

N-methyl-allylbicyclo[2.2.1]hept-5-ene-2,3-dicarboximide, N-methyl-allylmethylbicyclo[2.2.1]hept-5-ene-2,3-dicarboximide, N-methyl-methallylbicyclo[2.2.1]hept-5-ene-2,3-dicarboximide, N-methyl-methallylmethylbicyclo[2.2.1]hept-5-ene- 2,3-dicarboximide, N-(2-ethylhexyl)-allylbicyclo[2.2.1]hept-5-ene-2,3-dicarboximide, N-(2-ethylhexyl)-allylmethylbicyclo[2.2.1]hept-5-ene-2,3-dicarboximide, N-allyl-allylbicyclo[2.2.1]hept-5-ene-2,3-dicarboximide, N-allyl-allylmethylbicyclo[2.2.1]hept-5-ene- 2,3-dicarboximide, N-allyl-methallybicyclo[2.2.1]hept-5-ene- 2,3-dicarboximide, N-isopropenyl-allylbicyclo[2.2.1]hept-5-ene- 2,3-dicarboximide, N-isopropenyl-allylmethylbicyclo [2.2.1]hept-5-ene-2,3-dicarboximide, N-isopropenyl-methallylbicyclo 2.2.1]hept-5-2,3-dicarboximide, N-cyclohexyl-allylbicyclo [2.2.1]hept-5-ene-2,3-dicarboximide, N-cyclohexyl-allylmethylbicyclo[2.2.1]hept-5-ene- 2,3-dicarboximide, N-cyclohexyl-methallybicyclo [2.2.1]hept-5-ene-2,3-dicarboximide, N-phenyl-allylbicyclo [2.2.1]hept-5-ene-2,3-dicarboximide, N-phenyl-allylmethylbicyclo[2.2.1]hept-5-ene-2,3-dicarboximide, N-benzyl-allylbicyclo[2.2.1]hept-5-ene-2,3-dicarboximide, N-benzyl-allylmethylbicyclo[2.2.1]hept-5-ene-2,3-dicarboximide, N-benzyl-methallylbicyclo[2.2.1]hept-5-ene-2,3-dicarboximide, N-(2'-hydroxyethyl)-allylbicyclo[2.2.1] hept-5-ene-2,3-dicarboximide, N-(2'-hydroxyethyl)-allylmethylbicyclo[2.2.1]hept-5-ene-2,3-dicarboximide, N-(2'-hydroxyethyl)-methallylbicyclo[2.2.1]hept-5-ene-2,3-dicarboximide, N-(2',2'-dimethyl-3'-hydroxypropyl)-allylbicyclo[2.2.1]hept-5-ene-2,3-dicarboximide, N-(2',2'-dimethyl- 3'-hydroxypropyl)-allylmethylbicyclo[2.2.1]hept-5-ene- 2,3-dicarboximide, N-(2',3'-dihydroxypropyl)-allylbicyclo[2.2.1]hept-5-ene-2,3-dicarboximide, N-(2',3'-dihydroxypropyl)-allylmethylbicyclo[ 2.2.1]hept-5-ene-2,3-dicarboximide, N-(3'-hydroxy-1'-propenyl)-allylbicyclo [2.2.1]hept-5-ene-2,3-dicarboximide, N-(4'-hydroxycyclohexyl)-allylmethylbicyclo[2.2.1]hept-5-ene-2, 3-dicarboximide, N-(4'-hydroxyphenyl)-allylbicyclo[2.2.1] hept-5-ene- 2,3-dicarboximide, N-(4'-hydroxyphenyl)-allylmethylbicyclo[2.2.1]hept-5-ene-2,3-dicarboximide, N-(4'-hydroxyphenyl)-methallylbicyclo[2.2.1]hept-5-ene-2, 3-dicarboximide, N-(4'-hydroxyphenyl)-methallylmethylbicyclo[2.2.1]hept-5-ene-2,3-dicarboximide, N-( 3'-hydroxyphenyl)-allylbicyclo[2.2.1]hept-5-ene-2,3-dicarboximide, N-(3'-hydroxyphenyl)-allylmethylbicyclo[2.2.1]hept-5-ene-2,3-dicarboximide, N-(p-hydroxybenzyl)-allylbicyclo [2.2.1]hept-5-ene-2,3-dicarboximide, N-[2'-(2"-hydroxyethoxy)ethyl]-allylbicyclo[2.2.1]hept-5-ene-2,3-dicarboximide, N-[2'-(2"-hydroxyethoxy)ethyl]-allylmethylbicyclo[2.2.1]hept-5-ene-2,3-dicarboximide, N-[2'-(2"-hydroxyethoxy)ethyl]-methallylbicyclo[2.2.1] hept-5-ene-2,3-dicarboximide, N-[2'-( 2"-hydroxyethoxy)ethyl]-methallylmethylbicyclo[2.2.1]hept-5-ene- 2,3-dicarboximide, N-[2'-[2"-(2'''-hydroxyethoxy)ethoxy]ethyl]-allylbicyclo[2.2.1]hept-5-ene-2,3-dicarboximide, N-[2'-[2"-(2'''-hydroxyethoxy)ethoxy]]ethyl]-allylmethylbicyclo [2.2.1]hept-5-ene-2,3-dicarboximide, N-[2'-[2"-(2'''-hydroxyethoxy)ethoxy]ethyl]-methallylbicyclo[2.2.1]hept-5-ene-2,3-dicarboximide, N-[4'-( 4"-hydroxyphenylisopropylidene)phenyl]-allylbicyclo [2.2.1]hept-5-ene-2,3-dicarboximide, N-[4'-(4"-hydroxyphenylisopropylidene)phenyl]-allylmethylbicyclo[2.2.1] hept-5-ene-2,3-dicarboximide, N-[4'-( 4"-hydroxyphenylisopropylidene)phenyl]-methallylbicyclo [2.2.1]hept-5-ene-2,3-dicarboximide.

When n is 2, following compounds can be shown:

N,N'-ethylene-bis(allylbicyclo[2.2.1]hept-5-ene-2,3-dicarboximide), N,N'-ethylene-bis(allylmethylbicyclo[ 2.2.1]hept-5-ene-2,3-dicarboximide), N,N'-ethylene-bis(methallylbicyclo[2.2.1]hept-5-ene-2,3-dicarboximide), N,N'-hexamethylene-bis(allylbicyclo[2.2.1]hept-5-ene-2,3-dicarboximide), N,N'-hexamethylene-bis(allylmethylbicyclo[2.2.1]hept-5-ene-2,3-dicarboximide), N,N'-dodecamethylene-bis(allylbicyclo [2.2.1]hept-5-ene-2,3-dicarboximide), N,N'-dodecamethylene-bis(allylmethylbicyclo[2.2.1]hept-5-ene-2,3-dicarboximide), N,N'-cyclohexylene-bis(allylbicyclo [2.2.1]hept-5-ene-2,3-dicarboximide), N,N'-cyclohexylene-bis(allylmethylbicyclo[2.2.1]hept-5-ene-2,3-dicarboximide), 1,2-bis[3'-(allylbicyclo[2.2.1]hept-5-ene-2, 3-dicarboximido)propoxy]ethane, 1,2-bis[3'-(allylmethylbicyclo[2.2.1]hept-5-ene-2,3-dicarboximido)propoxy]ethane, 1,2-bis[3'-(methallylbicyclo[2.2.1]hept-5-ene-2,3-dicarboximido)propoxy]ethane, bis [2'-[3"-(allylbicyclo[2.2.1]hept-5-ene-2,3-dicarboximido)propoxy]ethyl]ether, bis[2'-[3"-(allylmethylbicyclo[2.2.1]hept-5-ene-2,3-dicarboximido)propoxy]ethyl]ether, 1,4-bis[3'-(allylbicyclo[2.2.1]hept-5-ene-2,3-dicarboximido)propoxy]butane, 1,4-bis[3'-(allylmethylbicyclo[2.2.1]hept-5-ene-2,3-dicarboximido)propoxy]butane, N, N'-p-phenylene-bis(allylbicyclo[2.2.1]hept-5-ene-2,3-dicarboximide), N,N'- p-phenylene-bis(allylmethylbicyclo[2.2.1]hept-5-ene-2,3-dicarboximide), N,N'-m-phenylene-bis(allylbicyclo[2.2.1]hept- 5-ene-2,3-dicarboximide), N,N'-m-phenylene-bis(allylmethylbicyclo[2.2.1]hept-5-ene-2,3-dicarboximide), N,N'-p-xylene-bis(allylbicyclo[2.2.1]hept-5-ene-2,3-dicarboximide), N,N'-p-xylene-bis(allylmethylbicyclo[2.2.1]hept-5-ene-2,3-dicarboximide), N,N'-m-xylene-bis(allylbicyclo[2.2.1]hept-5-ene-2,3-dicarboximide), N,N'-m-xylene-bis(allylmethylbicyclo[2.2.1]hept-5-ene-2,3-dicarboximide), N-[4-(allylmethylbicyclo[2.2.1]hept-5-ene-2,3-dicarboximidomethyl)phenyl]allylmethylbicyclo[2.2.1]hept-5-ene- 2,3-dicarboximide), 2,2-bis[4'-[4"-(allylbicyclo[2.2.1]hept-5-ene-2,3-dicarboximido)phenoxy]phenyl]propane, 2,2-bis[4'-[4"-(allylmethylbicyclo[2.2.1]hept-5-ene-2,3-dicarboximido)phenoxy]phenyl]propane, 2,2-bis[4'-[4"-(methallybicyclo[2.2.1]hept-5-ene-2,3-dicarboximido)phenoxy]phenyl]propane, bis[4-(allylbicyclo[2.2.1]hept-5-ene-2,3-dicarboximido)phenyl]methane, bis[4-(allylmethylbicyclo[2.2.1]hept-5-ene-2,3-dicarboximido)phenyl]methane, bis[4-(methallylbicyclo[2.2.1]hept-5-ene-2,3-dicarboximido)phenyl]methane, bis[4-(methallylmethylbicyclo[2.2.1]hept-5-ene-2,3-dicarboximido)phenyl]methane, bis[4-allylbicyclo[2.2.1]hept-5-ene- 2,3-dicarboximido)phenyl]ether, bis[4-(allylmethylbicyclo[2.2.1]hept-5-ene-2,3-dicarboximido)phenyl]ether, bis[4-(methallylbicyclo[2.2.1]hept-5-ene-2,3-dicarboximido)phenyl]ether, bis[4-(allylbicyclo[2.2.1]hept-5-ene- 2,3-dicarboximido)phenyl]sulfone, bis[4-(allylmethylbicyclo[2.2.1]hept-5-ene-2,3-dicarboximido)phenyl]sulfone, bis[4-(methallylbicyclo[2.2.1]hept-5-ene-2,3-dicarboximido)phenyl]sulfone, 1,6-bis(allylbicyclo[2.2.1]hept- 5-ene-2,3-dicarboximido)-3-hydroxyhexane, 1,12-bis(methallylbicyclo[2.2.1]hept-5-ene-2,3-dicarboximido)-3,6-dihydroxydodecane, 1,3-bis(allylbicyclo[2.2.1]hept-5-ene-2,3-dicarboximido)-5-hydroxycyclohexane, 1,5-bis[3'-(allylbicyclo[2.2.1]hept-5-ene-2,3-dicarboximido)propoxy]-3-hydroxypentane, 1,4-bis(allylbicyclo[2.2.1]hept-5-ene-2,3-dicarboximido)- 2-hydroxybenzene, 1,4-bis(allylmethylbicyclo[ 2.2.1]hept-5-ene-2,3-dicarboximido)- 2,5-dihydroxybenzene, N,N'-p-(2-hydroxy)xylylene-bis(allylbicyclo[2.2.1]hept-5-ene-2,3-dicarboximide), N,N'-p-( 2-hydroxy)xylylene-bis(allylmethylbicyclo[2.2.1]hept-5-ene- 2,3-dicarboximide), N,N'-m-(2-hydroxy)xylylene-bis(allylbicyclo[2.2.1]hept-5-ene-2,3-dicarboximide), N,N'-m-( 2-hydroxy)xylylene-bis(methallylbicyclo[2.2.1]hept-5-ene-2,3-dicarboximide), N,N'-p-(2,3-dihydroxy)xylylene-bis(allylbicyclo[2.2.1]hept-5-ene-2,3-dicarboximide), 2,2-bis[4'-[4"-(allylbicyclo[2.2.1]hept-5-ene-2,3-dicarboximido)- 2"-hydroxyphenoxy]phenyl]propane, bis [4-(allylmethylbicyclo[2.2.1]hept-5-ene-2,3-dicarboximido)-2-hydroxyphenyl]methane, bis[3-(allylbicyclo[2.2.1]hept-5-ene- 2,3-dicarboximido)-4-hydroxyphenyl]ether, bis[3-(methallylbicyclo[2.2.1]hept-5-ene-2,3-dicarboximido)-5-hydroxyphenyl]sulfone.

The alkenyl-substituted nadimides used in the present invention are not limited to the compounds given above. Further, the term "alkenyl-substituted nadimide" used herein means either alkenyl-substituted nadimide monomers or oligomers. These alkenyl-substituted nadimides can be used either singly, or as a mixture of two or more of them.

Divinyl compounds or monovinyl compounds are usually used as the compound having at least one vinyl group which is one of the compounds used as component (B) in the present invention. Included in examples of the divinyl compounds are o-divinylbenzene, m-divinylbenzene, p-divinylbenzene, divinylnaphthalene, divinyl adipate, 1,5-hexadiene-3,4-diol, 1,3-butadiene, 1,4-pentadiene, 1,3-divinyl-1,1,3,3-tetramethyldisiloxane, 3,9-divinyl-2,4,8,10-tetraoxaspiro]5.5[undecane, di-2-propenyl 1,2-benzenedicarboxylate, di-2-propenyl 1,3-benzenedicarboxylate, N-2-propenyl-2-propene-1-amine, 1,1'-oxybisethene, 3,3'-oxybis- 1-propene, 1,1'-thiobisethene, 1,1'-sulfonylbisethene, 2,2-dichloro-N, N-di (2-propenyl)acetamide, di-1-propenyldisulfide, and the like. Ethylvinylbenzene, styrene, α-methylstyrene, vinylnaphthalene, acrylonitrile, vinyl esters of fatty acid, acrylic acid, methacrylic acid, maleic acid, fumaric acid, itaconic acid, esters of these acids, and the like are given as examples of monovinyl compounds.

Given as examples of cyclic olefins which are another type of component (B) are cyclopentene, cyclohexene, 4-vinylcyclohexene, cycloheptene, cyclooctene, cyclododecene, cyclopentadiene, dicyclopentadiene, 1,3-cyclohexadiene, 1,3-cycloheptadiene, 1,5-cyclooctadiene, indene, and the like.

Among these, divinyl compounds are more preferred than monovinyl compounds or cyclic olefins in view of reactivity of the resulting composition and workability in the preparation of the composition. Among divinyl compounds, o-divinylbenzene, p-divinylbenzene, m-divinylbenzene, di-2-propenyl 1,2-benzenedicarboxylate, di-2-propenyl 1,3-benzenedicarboxylate and 3,9-divinyl-2,4,8,10-tetraoxaspiro[5.5]undecane are preferred. These compounds of component (B) can be used either singly or as a mixture of two or more.

Included in phenol resins used as component (C) in the present invention are, beside typical phenol resins prepared from a phenolic compound and formaldehyde or a formaldehyde-forming compound, aromatic hydrocarbon resins such as xylene-formaldehyde resin, a reaction product of xylene resin and phenol, phenol-alkyl resin synthesized by the reaction of phenol axed dimethoxy xylene, phenol-dicyclopentadiene resin obtained by the reaction of phenol and dicyclopentadiene, resins obtained by the polymerization of paravinyl phenol, isopropyl phenol, and the like. Denatured resins obtained from these resins can be also used. A mixture of several these resins may be used. Further, phenol resins may be either of novolak-type or resol-type. Novolak-type is more preferred in view of compatibility with component (A) and component (B). A number average molecular weight of the phenol resins is 200–2,000, and preferably 300–900. Given as examples of phenol compounds which are raw materials for typical phenol resins are phenol, cresol, xylenol, ethylphenol, p-tert-butylphenol, p-octylphenol, p-nonylphenol, p-cumylphenol, p-phenylphenol, hydroquinone, resorcin, catechol, bisphenol A, bisphenol F, naphthol, methylcatechol, butylcatechol, cresorcin, methylhydroquinone, pyrogallol, dihydroxynaphthalene, trihydroxynaphthalene, and the like, and mixtures of these phenol compounds.

The proportion of component (A), i.e., an alkenyl-substituted nadimide; component (B), i.e., a compound having at least olde vinyl group and/or cyclic olefin; and component (C), i.e., a phenol resin; call be arbitrarily determined. Generally, the anti-hygroscopicity and toughness of the cured product are remarkably improved with a slight decrease in the mechanical strength, when the ratio of the amount of component (B) plus component (C), {(B)+(C)}, for the amount of component (A) is increased. There is a tendency that the mechanical strength and heat resistance at high temperatures of the cured product are increased, if the ratio of component (A) for component {(B)+(C)} is increased. Because of these reasons and taking into consideration of processability and the curing rate of the composition, as well as characteristics of the final cured product, the ratio by weight of (A)/{(B)+(C)} is 96/4–1/99, preferably 96/4–10/90, more preferably 96/4–20/80 and still more preferably 80/20–20/80, and the ratio by weight of (B)/(C) is 60/40–40/60. However, if requirements for mechanical strength and heat resistance at high temperatures of the cured product are not so high and requirements for anti-hygroscopicity and toughness are high, the ratio of component (A) for component {(B)+(C)}, (A)/{(B)+(C)} of 20/80 –1/99 is preferred. In (A)/{(B)+(C)}, if the ratio of {(B)+ (C)} is less than 4, the toughness and anti-hygroscopicity are insufficient; if it is greater than 99, the heat resistance and the mechanical strength at high temperatures are poor. Regarding the ratio by weight of component (B) and component (C), if the amount of component (B) is more than 60 wt. %, the molding shrinkage is high; if the amount of component (C) is more than 60 wt. %, the mechanical strength at high temperatures is impaired.

The thermosetting resin composition of the present invention can optionally contain a polymerization catalyst as component (D). The polymerization catalyst can preferably be selected from (1) organic peroxides, (2) onium salts or (3) cationic catalysts.

As (1) the organic peroxides which are one group of component (D) usable in the present invention, for example, di-t-butyl peroxide, di-t-amyl peroxide, dicumyl peroxide, t-butylcumyl peroxide, diacetyl peroxide, dipropionyl peroxide, di-i-butyryl peroxide, benzoyl peroxide, succinic acid peroxide, t-butyl hydroperoxide, cyclohexyl hydroperoxide, cumene hydroperoxide, t-butyl peroxybenzoate, t-butyl peroxypivalate, 1,1-di(t-butylperoxy) cyclohexane, di-t-butyl peroxyisophthalate, t-butyl peroxymaleate, t-butyl peroxyisopropylcarbonate and 2,2-di(t-butylperoxy) butane can be cited.

As (2) the onium salts which are other group of component (D) usable in the present invention, for example, ammonium compounds, such as benzyltriethylammonium chloride, benzyltriethyl ammonium bromide, phenyltrimethylammonium bromide, tetra-n-butylammonium chloride, tetra-n-butylammonium perchlorate, tetraethylammonium tetrafluoroborate, m-trifluoromethylphenyltrimethylammonium bromide and tetra-n-butylammonium trifluoromethanesulfonate; phosphonium compounds, such as methyltriphenylphosphonium iodide, methyltriphenylphosphonium bromide, benzyltriphenylphosphonium chloride, tetraphenylphosphonium bromide and 3-bromopropyltriphenylphosphonium bromide; arsonium compounds, such as benzyltriphenylarsonium chloride, tetraphenylarsonium bromide and tetra-n-butylarsonium chloride; stibonium compounds, such as benzyltriphenylstibonium chloride and tetraphenylstibonium bromide; oxonium compounds, such as triphenyloxonium chloride and triphenyloxonium bromide; sulfonium compounds, such as triphenylsulfonium tetrafluoroborate, triphenylsulfonium hexafluoroarsenate, tri (p-methoxyphenyl) sulfonium hexafluorophosphate, tri(p-tolyl)sulfonium tetrafluoroborate, dimethylphenacylsulfonium hexafluorophosphate and dimethylphenacylsulfonium tetrafluoroborate; selenonium compounds, such as triphenylselenonium tetrafluoroborate, triphenylselenonium hexafluoroarsenate, triphenylselenonium hexafluoroantimonate axed p-(t-butylphenyl) diphenylselenonium hexafluoroarsenate; stannonium compounds, such as triphenylstannonium chloride, triphenylstannonium bromide, tri-n-butylstannonium bromide and benzyldiphenylstannonium chloride; and iodonium compounds, such as diphenyliodonium chloride, diphenyliodonium bromide, diphenyliodonium perchlorate, diphenyliodonium tetrafluoroborate, diphenyliodonium hexafluoroarsenate, diphenyliodonium hexafluorophosphate, diphenyliodonium hexafluoroantimonate, (p-methoxyphenyl)phenyliodonium tetrafluoroborate, di(2-nitrophenyl)iodonium hexafluoroarsenate, di(p-tolyl)iodonium hexafluorophosphate and di(p-chlorophenyl)iodonium hexafluoroarsenate can be cited.

As (3) the cationic catalysts which are still other group of component (D) usable in the present invention, for example, acids or Brønsted acids which can give protons, and esters thereof or amine complexes thereof, such as sulfuric acid, dimethyl sulfate, diethyl sulfate, pyridine sulfate, phosphoric acid, phosphorous acid, phenylphosphonic acid, triethyl phosphate, dimethyl phosphate, phenyl phosphite, methanesulfonic acid, -trifluoromethanesulfonic acid, m-xylene-4-sulfonic acid, p-xylene-2-sulfonic acid, benzenesulfonic acid, p-toluenesulfonic acid, p-toluenesulfonic acid·triphenylamine complex, p-toluenesulfonic acid·pyridine complex, m-nitrobenzenesulfonic acid·pyridine complex, naphthalenesulfonic acids, methyl benzenesulfonate and ethyl p-toluenesulfonate; and halides showing Lewis acidity or their complexes with bases, or the like, such as boron trichloride, boron trifluoride, boron trifluoride·ether complex, ferric chloride, stannic tetrachloride, titanium tetrachloride, aluminium chloride, aluminium chloride·pyridine complex, aluminium bromide, zinc chloride and antimony pentachloride can be cited.

The catalysts mentioned above are given only for illustration, axed of course, catalysts usable in the present invention are not limited thereto.

Component (D) of the present invention, which is (1) an organic peroxide, (2) an onium salt, or (3) a cationic catalyst, can be used in an amount selected from a wide range, normally 0.005–10 wt. %, and preferably 0.01–5 wt. %, of the total amount of components (A), (B) and (C).

Because of superior compatibility among the components, there is no need to use a solvent together with the thermosetting resin composition of the present invention. It can be used for a variety of applications without being limited to the application wherein the composition is made into a varnish-like material by dissolving it in a solvent. It is useful as a laminating material, a casting material, a molding material, a coating material, a paint, an adhesive, a sealing material and the like. It is useful also as a matrix resin for composite materials in which glass fiber, carbon fiber, or the like is used as a reinforcing material. When the thermosetting resin composition of the present invention is used as a matrix resin for composite materials, various kinds of fillers, such as glass fibers, carbon fibers, metal fibers, ceramic fibers, calcium phosphate, calcium carbonate, magnesium carbonate, aluminum hydroxide, magnesium hydroxide, antimony oxide, gypsum, silica, alumina, clay, talc, quartz powders, carbon black, and the like can be used as a reinforcing material. An amount of 10–500 parts by weight of these fillers may be added to and mixed with 100 parts by weight of the thermosetting resin composition to obtain a composite material.

Curing of the thermosetting resin composition of the present invention can be carried out, usually, by heating it for 0.01–20 hours at 50°–260° C.. These curing conditions are varied depending on the application to which the composition is directed. For example, when it is used as a molding material, the composition comprising three components (A), (B) and (C), or four components (A), (B), (C) and (D) is mixed and melted, axed molded by casting, injection, pressmolding, or the like. The curing temperature is 50°–260 ° C., preferably 80°–250° C., and the curing time is 0.5–20 hours, preferably 1 to 10 hours. When it is used as a paint or a coating material, the mixture is blended and melted in the absence or presence of a solvent, and is applied to an object to be painted or coated, and the solvent is removed, if necessary. The composition is then polymerized and cured by heating at 80°–260° C., preferably at 80°–220° C., for 0.01–5 hours, preferably 0.05–2 hours, to obtain thin films or coatings.

The molded articles, composite materials, thin films coatings, adhesives, and the like obtained under the above curing conditions can be further treated with heat, if necessary, at a temperature of 150°–350° C. for 0.5–30 hours.

In the thermosetting resin composition of the present invention, time components contained exhibit excellent compatibility among them. Because the cured product obtained from the thermosetting resin composition has superior anti-hygroscopicity and toughness, without impairing excellent heat resistance, electrical characteristics, mechanical strength, d small molding shrinkage inherently possessed by alkenyl-substituted nadimide, the composition is useful not only as a laminating material, a casting material, a molding material, a coating material, a paint, an adhesive, a sealing material and the like, but also as a matrix resin for composite materials using glass fiber, carbon fiber, or the like as a reinforcing material. Further, because the composition can be made into a homogeneous mixture without using a solvent due to the excellent compatibility among the components, not only the processability is promoted but also homogeneous cured products can be prepared even if time ratio of components is widely changed depending on the purpose of use. Thus, the manner of use is not limited to production of varnish to form films or coatings.

DESCRIPTION OF THE PREFERRED EMBODIMENTS

The present invention is hereinafter illustrated by way of examples which shall not be construed as limiting the present invention.

EXAMPLE 1

A mixture of 90 parts by weight of N,N'-hexamethylene-bis (allylbicyclo[2.2.1]hept-5-ene-2,3-dicarboximide (hereinafter referred to BANI-H), as component (A) ; 5 parts by weight of a mixture of divinylbenzene (81%) and ethylstyrene (19%) (manufactured by Sankyo Kasei Corp.), as component (B); 5 parts by weight of novolak-type phenol resin (Plyophen TD- 2093, tradename, manufactured by Dainippon Ink and Chemicals, Inc.), as component (C) ; and 3 parts by weight of a 30% phenol solution of xylenesulfonic acid, as component (D), were stirred at 80° C. to obtain a solution. This solution was treated as follows and used for cast molding.

First Step: Heated and maintained at 150° C. for 3 hours

Second Step: Heated and maintained at 200° C. for 2 hours

Third Step: Heated and maintained at 225° C. for 2 hours

Fourth Step: Heated and maintained at 250° C. for 10 hours

Test specimens were prepared from the cured product to measure the result of thermogravimetry (the temperature at 5% weight loss as measured in a nitrogen atmosphere at a temperature rise of 5° C./minute according to the TGA method), the fracture toughness ($K_{IC}$: according to ASTM D5045-91A), the mold shrinkage factor (according to JIS-K6911), the tensile strength (according to JIS-K7113, using No. 1 type test specimen), the water absorption (according to JIS-K7209), the flexural strength (three-point bending test according to JIS-K 7203), and the flexural modulus of elasticity (three-point bending test according to JIS-K7203). (These test methods were applied also in the following examples.) The results are shown in Table 1.

EXAMPLE 2

A composition was prepared from the same components as in Example 1, except that the amounts of components (A), (B), and (C) used were 50, 25, and 25 parts by weight, respectively. The composition was heated and molded in the same manner as in Example 1. The proper ties of the cured products were evaluated, and the results are shown in Table 1.

EXAMPLE 3

A composition was prepared from the same components as in Example 1, except that the amounts of components (A), (B), and (C) used were 40, 30, and 30 parts by weight, respectively. The composition was heated and molded in the same manner as in Example 1. The properties of the cured products were evaluated, and the results are shown in Table 1.

EXAMPLE 4

A composition was prepared from the same components as in Example 1, except that the amounts of components (A), (B), and (C) used were 30, 35, and 35 parts by weight, respectively. The composition was heated and molded in the same manner as in Example 1. The properties of the cured products were evaluated, axed the results are shown in Table 1.

EXAMPLE 5

A composition was prepared from the same components as in Example 1, except that the amounts of components (A), (B), and (C) used were 10, 45, and 45 parts by weight, respectively. The composition was heated and molded in the same manner as in Example 1. The proper ties of the cured products were evaluated, and the results are shown in Table 1.

EXAMPLE 6

A composition was prepared from the same components as in Example 1, except that the amounts of components (A), (B), and (C) used were 4, 48, and 48 parts by weight, respectively. The composition was heated and molded in the same manner as in Example 1. The properties of the cured products were evaluated, and the results are shown in Table 2.

EXAMPLE 7

A composition was prepared in the same manner as in Example 2, except that as component (A), N,N'-m-xylylene-bis(allylbicyclo[2.2.1]hept-5-ene-2,3-dicarboximide) (hereinafter referred to BANI-X) was used instead of BANI-H used in Example 2. The composition was heated and molded in the same manner as in Example 1. The properties of the cured products were evaluated, and the results are shown in Table 2.

EXAMPLE 8

A composition was prepared in the same manner as in Example 2, except that as component (A), bis[4-(allylbicyclo[2.2.1]hept-5-ene-2,3-dicarboximido) phenyl]methan (hereinafter referred to BANI-M) was used instead of BANI-H used in Example 2. The composition was heated and molded in the same manner as in Example 1. The properties of the cured products were evaluated, and the results are shown in Table 2.

EXAMPLE 9

A composition was prepared from the same components as in Example 8, except that the amounts of components (A), (B), and (C) used were 80, 10, and 10 parts by weight, respectively. The composition was heated and molded in the same manner as in Example 1. The properties of the cured products were evaluated, and the results are shown in Table 2.

EXAMPLE 10

A composition was prepared from the same components as in Example 8, except that the amounts of components (A), (B), and (C) used were 20, 40, and 40 parts by weight, respectively. The composition was heated and molded in the same manner as in Example 1. The properties of the cured products were evaluated, and the results are shown in Table 2.

EXAMPLE 11

A composition was prepared from the same components as in Example 2, except that the amount of component (D) was changed to 1 part by weight instead of 3 parts by weight used in Example 2. The composition was heated and molded in the same manner as in Example 1. The properties of the cured products were evaluated, and the results are shown in Table 3.

EXAMPLE 12

A composition was prepared in the same manner as Example 2, except that as component (D), di(p-chlorophenyl)iodonium hexafluoroarsenate was used instead of the 30% phenol solution of xylenesulfonic acid used in Example 2. The composition was heated and molded in the same manner as in Example 1. The properties of the cured products were evaluated, and the results are shown in Table 3.

EXAMPLE 13

A composition was prepared in the same manner as in Example 2, except that as component (D), p-toluenesulfonic acid·pyridine complex was used instead of the 30% phenol solution of xylenesulfonic acid used in Example 2. The composition was heated and molded in the same manner as in Example 1. The properties of the cured products were evaluated, and the results are shown in Table 3.

EXAMPLE 14

A composition was prepared in the same manner as in Example 2, except that as component (C), resol-type phenol resin (SUMIKON PR-175, tradename, manufactured by Sumitomo Bakelite Company, Ltd.) was used instead of novolak-type phenol resin used in Example 2, and component (D) was not used. The composition was heated and molded in the same manner as in Example 1. The properties of the cured products were evaluated, and the results are shown in Table 3.

EXAMPLE 15

This example is not within the scope of this invention, and is given for comparative purpose.

A composition was prepared in the same manner as in Example 1, except that the amount of component (A) was changed to 100 parts by weight and component (B) and (C) were not used. The composition was heated and molded in the same manner as in Example 1. The properties of the cured products were evaluated, and the results are shown in Table 3.

EXAMPLE 16

This example is not within the scope of this invention, and is given for comparative purpose.

A composition was prepared in the same manner as in Example 15, except that as component (A), BANI-X was used instead of BANI-H used in Example 15. The composition was heated and molded in the same manner as in Example 1. The properties of the cured products were evaluated, and the results are shown in Table 4.

EXAMPLE 17

This example is not within the scope of this invention, and is given for comparative purpose.

A composition was prepared in the same manner as in Example 15, except that as component (A), BANI-M was used instead of BANI-H used in Example 15. The composition was heated and molded in the same manner as in Example 1. The properties of the cured products were evaluated, and the results are shown in Table 4.

EXAMPLE 18

This example is not within the scope of this invention, and is given for comparative purpose.

A composition was prepared in the same manner as in Example 1, except that the amounts of components (B) and (C) used were 50 and 50 parts by weight, respectively, and component (A) was not used. The composition was heated and molded in the same manner as in Example 1. The properties of the cured products were evaluated, and the results are shown in Table 4.

EXAMPLE 19

This example is not within the scope of this invention, axed is given for comparative purpose.

A composition was prepared in the same manner as in Example 1, except that the amounts of components (A) and (B) used were 50 and 50 parts by weight, respectively, and component (C) was not used. The composition was heated and molded in the same manner as in Example 1. The properties of the cured products were evaluated, and the results are shown in Table 4.

EXAMPLE 20

This example is not within the scope of this invention, and is given for comparative purpose.

A composition was prepared in the same manner as in Example 1, except that the amounts of components (A) and (C) used were 50 and 50 parts by weight, respectively, and component (B) was not used. The composition was heated and molded in the same manner as in Example 1. The properties of the cured products were evaluated, and the results are shown in Table 4.

TABLE 1

|  | Examples | | | | |
| --- | --- | --- | --- | --- | --- |
|  | 1 | 2 | 3 | 4 | 5 |
| Compositions (parts by weight) | | | | | |
| Component (A) | 90[1] | 50[1] | 40[1] | 30[1] | 10[1] |
| Component (B) | 5[4] | 25[4] | 30[4] | 35[4] | 45[4] |
| Component (C) | 5[5] | 25[5] | 30[5] | 35[5] | 45[5] |
| Component (D) | 3[7] | 3[7] | 3[7] | 3[7] | 3[7] |
| TGA results (°C.)[10] | 427 | 420 | 415 | 410 | 390 |
| $K_{IC}$ (MN/m$^{3/2}$)[11] | 0.72 | 0.83 | 0.85 | 0.90 | 0.95 |
| Molding shrinkage factor (%) | 1.3 | 1.5 | 1.5 | 1.6 | 1.7 |
| Tensile strength (Kgf/cm$^2$) | 455 | 450 | 449 | 447 | 445 |
| Water absorption (%)[12] | | | | | |
| 23° C., 24 hrs. | 0.35 | 0.24 | 0.22 | 0.20 | 0.17 |
| 100° C., 2 hrs. | 0.58 | 0.46 | 0.41 | 0.37 | 0.29 |
| Flexural strength (Kgf/mm$^2$) | | | | | |
| 23° C. | 11.7 | 11.6 | 12.0 | 12.5 | 13.6 |
| 200° C. | 9.7 | 9.0 | 8.9 | 8.7 | 8.5 |
| Flexural modulus of elasticity (Kgf/mm$^2$) | 288 | 294 | 295 | 297 | 300 |

TABLE 2

|  | Examples | | | | |
| --- | --- | --- | --- | --- | --- |
|  | 6 | 7 | 8 | 9 | 10 |
| Compositions (parts by weight) | | | | | |
| Component (A) | 4[1] | 50[2] | 50[3] | 80[3] | 20[3] |
| Component (B) | 48[4] | 25[4] | 25[4] | 10[4] | 40[4] |
| Component (C) | 48[5] | 25[5] | 25[5] | 10[5] | 40[5] |
| Component (D) | 3[7] | 3[7] | 3[7] | 3[7] | 3[7] |
| TGA results (°C.)[10] | 388 | 427 | 430 | 425 | 400 |
| $K_{IC}$ (MN/m$^{3/2}$)[11] | 1.01 | 0.71 | 0.58 | 0.64 | 0.90 |
| Molding shrinkage factor (%) | 2.1 | 1.4 | 1.1 | 1.3 | 1.7 |
| Tensile strength (Kgf/cm$^2$) | 450 | 584 | 478 | 460 | 447 |
| Water absorption (%)[12] | | | | | |
| 23° C. 24 hrs. | 0.15 | 0.29 | 0.43 | 0.33 | 0.21 |
| 100° C. 2 hrs. | 0.28 | 0.50 | 0.82 | 0.51 | 0.35 |
| Flexural strength (Kgf/mm$^2$) | | | | | |
| 23° C. | 13.5 | 15.9 | 13.8 | 13.5 | 13.6 |
| 200° C. | 8.0 | 11.5 | 10.5 | 9.1 | 8.0 |
| Flexural modulus of elasticity (Kgf/mm$^2$) | 305 | 320 | 305 | 322 | 325 |

TABLE 3

|  | Examples | | | | |
| --- | --- | --- | --- | --- | --- |
|  | 11 | 12 | 13 | 14 | 15 |
| Compositions (parts by weight) | | | | | |
| Component (A) | 50[1] | 50[1] | 50[1] | 50[1] | 100[1] |
| Component (B) | 25[4] | 25[4] | 25[4] | 25[4] | — |
| Component (C) | 25[5] | 25[5] | 25[5] | 25[6] | — |
| Component (D) | 1[7] | 3[8] | 3[9] | — | 3[7] |
| TGA results (°C.)[10] | 418 | 410 | 415 | 410 | 430 |
| $K_{IC}$ (MN/m$^{3/2}$)[11] | 0.82 | 0.78 | 0.80 | 0.78 | 0.65 |
| Molding shrinkage factor (%) | 1.5 | 1.9 | 1.7 | 1.8 | 1.3 |
| Tensile strength (Kgf/cm$^2$) | 455 | 455 | 470 | 460 | 460 |
| Water absorption (%)[12] | | | | | |
| 23° C. 24 hrs. | 0.26 | 0.30 | 0.28 | 0.30 | 0.90 |
| 100° C. 2 hrs. | 0.49 | 0.53 | 0.45 | 0.48 | 1.60 |
| Flexural strength (Kgf/mm$^2$) | | | | | |
| 23° C. | 11.3 | 11.0 | 12.3 | 11.5 | 12.4 |
| 200° C. | 9.0 | 8.0 | 8.0 | 9.0 | 11.2 |
| Flexural modulus of elasticity (Kgf/mm$^2$) | 295 | 300 | 302 | 310 | 330 |

TABLE 4

|  | Examples | | | | |
| --- | --- | --- | --- | --- | --- |
|  | 16 | 17 | 18 | 19 | 20 |
| Compositions (parts by weight) | | | | | |
| Component (A) | 100[2] | 100[3] | — | 50[1] | 50[1] |
| Component (B) | — | — | 50[4] | 50[4] | — |
| Component (C) | — | — | 50[5] | — | 50[5] |
| Component (D) | 3[7] | 3[7] | 3[7] | 3[7] | 3[7] |
| TGA results (°C.)[10] | 437 | 435 | 387 | 430 | 330 |
| $K_{IC}$ (MN/m$^{3/2}$)[11] | 0.72 | 0.56 | 1.10 | 0.90 | 0.64 |
| Molding shrinkage factor (%) | 1.0 | 0.8 | 3.0 | 6.0 | 1.9 |
| Tensile strength (Kgf/cm$^2$) | 770 | 550 | 460 | 478 | 460 |
| Water absorption (%)[12] | | | | | |
| 23° C. 24 hrs. | 0.80 | 1.00 | 0.14 | 0.10 | 0.33 |
| 100° C. 2 hrs. | 1.10 | 1.60 | 0.28 | 0.25 | 0.51 |
| Flexural strength (Kgf/mm$^2$) | | | | | |
| 23° C. | 16.0 | 12.3 | 13.4 | 13.8 | 8.0 |
| 200° C. | 14.4 | 9.7 | 2.0 | 5.0 | 1.0 |
| Flexural modulus of elasticity (Kgf/mm$^2$) | 356 | 360 | 328 | 305 | 322 |

In the Tables 1–4, remarks 1)–12) mean as follows:
[1] N,N'-hexamethylene-bis(allylbicyclo[2.2.1]hept-5-ene-2,3-dicarboximide)
[2] N,N'-m-xylylene-bis(allylbicyclo[2.2.1]hept-5-ene-2,3-dicarboximide)
[3] Bis[4-(allylbicyclo[2.2.1]hept-5-ene-2,3-dicarboximido)phenyl]methane
[4] A mixture of divinylbenzene (81%) and ethylstyrene (19%) (manufactured by Sankyo Kasei Corp.)
[5] Novolak-type phenol resin (Plyophen TD-2093, tradename, Dainippon Ink and Chemicals, Inc.)
[6] Resol-type resin (SUMIKON PR-175, tradename, Sumitomo Bakelite Company, Ltd.)
[7] A 30% phenol solution of xylenesulfonic acid
[8] Di(p-chlorophenyl)iodonium hexafluoroarsenate
[9] P-toluenesulfonic acid.pyridine complex
[10] Temperature at 5% weight loss as measured in a nitrogen atmosphere at a temperature rise of 5° C./minute according to the TGA method
[11] Fracture toughness according to ASTM D5045-91A
[12] Measured by completely immersing a specimen in a distilled water kept at 23° C. or 100° C. for 24 hours.

Discussing the results obtained in Examples 1–20, the compositions of Examples 15–17, wherein only component (A) and component (D) were used, exhibited high hygroscopicity, indicating their insufficient anti-hygroscopicity. In the case of Example 18, wherein only components (B), (C) and (D) were used, the cured product exhibited a low temperature at 5% weight loss in TGA, insufficient heat resistance, and a high molding shrinkage factor. The composition further exhibited low flexural strength at 200° C. The composition of Example 19, wherein only components (A), (B) and (D) were used, exhibited a high molding shrinkage factor and low flexural strength at 200° C. The composition of Example 20, wherein only components (A), (C) and (D) were used, exhibited a low temperature at 5% weight loss in TGA, insufficient heat resistance, and low flexural strength at 200° C.

We claim:

1. A thermosetting resin composition comprising components (A) an alkenyl-substituted nadimide, (B) a compound having at least one vinyl group selected from the group consisting of o-, p-, m-divinylbenzene, di-2-propenyl, 1,2-benzenedicarboxylate, di-2-propenyl 1,3-benzenedicarboxylate, 3,9-divinyl-2,4,8,10-tetraoxaspiro(5.5) undecane ethylvinylbenzene, a-methylstyrene and vinylnaphthalene, or cyclic olefin, or both and (C) a phenol resin selected from the group consisting of novolak-type or resol-type typical phenol resins, a reaction product of xylene resin and phenol, phenol-alkyl resin and phenol-dicyclopentadiene resin.

2. A thermosetting resin composition as claimed in claim 1, wherein said alkenyl-substituted nadimide has following chemical structure:

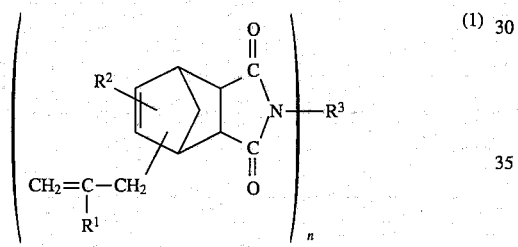

3. A thermosetting resin composition as claimed in claim 2, wherein said alkenyl-substituted nadimide has two alkenyl groups in the molecule.

4. A thermosetting resin composition as claimed in claim 3, wherein n is 1, and $R^3$ is a $C_3$-$C_6$ alkenyl group.

5. A thermosetting resin composition as claimed in claim 3, wherein n is 2.

6. A thermosetting resin composition as claimed in claim 5, wherein $R^3$ is selected from the group consisting of (i) $C_2$-$C_{20}$ alkylene group, (ii) —R-$C_6H_4$-(R')$_m$— (wherein m is an integer of 0 or 1 and R and R' may be the same or different and each individually represents a $C_1$-$C_4$ alkylene group or a $C_5$-$C_8$ cycloalkylene group) and (iii) —$C_6H_4$-A-$C_6H_4$— (wherein A represents —$CH_2$—, —$C(CH_3)_2$—, —CO—, —O—, —$OC_6H_4C(CH_3)_2C_6H_4O$—, —S—, or —$SO_2$—).

7. A thermosetting resin composition as claimed in claim 1, wherein said component (B) is selected from the group consisting of o-, p-, m-divinylbenzene, di-2-propenyl t,2-benzenedicarboxylate, di-2-propenyl 1,3 -benzenedicarboxylate and 3,9-divinyl-2,4,8,10-tetraoxaspiro(5.5) undecane.

8. A thermosetting resin composition as claimed in claim 1, wherein component (C) is a novolak-type typical phenol resin or a resol-type typical phenol resin.

9. A thermosetting resin composition as claimed in claim 1, further comprising (D) at least one polymerization catalyst selected from the group consisting of organic peroxides, onium salts, and cationic catalysts.

10. A thermosetting resin composition as claimed in claim 1, wherein the ratio by weight of component (A) to components (B) and (C), (A)/{(B)+(C)}, is 96/4–1/99 and the ratio by weight of component (B) to component (C), (B)/(C), is 60/40–40/60.

11. A thermosetting resin composition as claimed in claim 10, wherein said ratio by weight of component (A) to components (B) and (C), (A)/{(B)+(C)}, is 96/4–10/90.

12. A thermosetting resin composition as claimed in claim 10, wherein the lower end of said ratio by weight of component (A) to components (B) and (C), (A)/{(B)+(C)}, is greater than or equal to 20/80.

13. A thermosetting resin composition as claimed in claim 10, wherein said ratio by weight of component (A) to components (B) and (C), (A)/{(B)+(C)}, is 20/80–1/99.

14. A thermosetting resin composition as claimed in claim 9, wherein the ratio by weight of component (A) to components (B) and (C), (A)/{(B)+(C)}, is 96/4–1/99 and the ratio by weight of component (B) to component (C), (B)/(C), is 60/40–40/60.

15. A thermosetting resin composition as claimed in claim 14, wherein said ratio by weight of component (A) to components (B) and (C), (A)/{(B)+(C)}, is 96/4–10/90.

16. A thermosetting resin composition as claimed in claim 14, wherein the lower end of said ratio by weight of component (A) to components (B) and (C), (A)/{(B)+(C)}, is greater than or equal to 20/80.

17. A thermosetting resin composition as claimed in claim 14, wherein said ratio by weight of component (A) to components (B) and (C), (A)/{(B)+(C)}, is 20/80–1/99.

18. A thermosetting resin composition as claimed in claim 9, wherein the amount of component (D) is 0.005–10 weight percent based on the total amount of components (A), (B) and (C).

19. A thermosetting resin composition as claimed in claim 5, wherein the ratio by weight of component (A) to components (B) and (C), (A)/{(B)+(C)}, is 96/4–1/99 and the ratio by weight of component (B) to component (C), (B)/(C), is 60/40–40/60.

20. A thermosetting resin composition as claimed in claim 19, wherein said ratio by weight of component (A) to components (B) and (C), (A)/{(B)+(C)}, is 96/4–10/90.

21. A thermosetting resin composition as claimed in claim 19, wherein the lower end of said ratio by weight of component (A) to components (B) and (C), (A)/{(B)+(C)}, is greater than or equal to 20/80.

22. A thermosetting resin composition as claimed in claim 19, wherein said ratio by weight of component (A) to components (B) and (C), (A)/{(B)+(C)}, is 20/80–1/99.

23. A thermosetting resin composition as claimed in claim 5, further comprising (D) at least one polymerization catalyst selected from the group consisting of organic peroxides, onium salts, and cationic catalysts.

24. A thermosetting resin composition as claimed in claim 23, wherein the ratio by weight of component (A) to components (B) and (C), (A)/{(B)+(C)}, is 96/4–1/99 and the ratio by weight of component (B) to component (C), (B)/(C), is 60/40–40/60.

25. A thermosetting resin composition as claimed in claim 24, wherein said ratio by weight of component (A) to components (B) and (C), (A)/{(B)+(C)}, is 96/4–10/90.

26. A thermosetting resin composition as claimed in claim 24, wherein the lower end of said ratio by weight of component (A) to components (B) and (C), (A)/{(B)+(C)}, is greater than or equal to 20/80.

27. A thermosetting resin composition as claimed in claim 24, wherein said ratio by weight of component (A) to components (B) and (C), (A)/{(B)+(C)}, is 20/80–1/99.

28. A thermosetting resin composition as claimed in claim 23, wherein the amount of component (D) is 0.005–10 weight percent based on the total amount of components (A), (B) and (C).

29. A thermosetting resin composition as claimed in claim 1, wherein polymerizable components contained therein consist essentially of (A) said alkenyl-substituted nadimide, (B) said compound having at least one vinyl group or said cyclic olefin, or both and (C) said phenol resin.

30. A thermosetting resin composition characterized in that polymerizable components contained therein consist essentially of (A) an alkenyl-substituted nadimide, (B) a compound having at least one vinyl group or cyclic olefin, or both and (C) a phenol resin.

* * * * *